United States Patent
Dollin et al.

(10) Patent No.: US 7,036,111 B2
(45) Date of Patent: Apr. 25, 2006

(54) CODE VERIFICATION SYSTEM AND METHOD

(75) Inventors: Christopher J Dollin, Bristol (GB); Vaideswar Gopalakrishnan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 09/871,778

(22) Filed: Jun. 1, 2001

(65) Prior Publication Data
US 2002/0194579 A1 Dec. 19, 2002

(51) Int. Cl.
*G06F 9/44* (2006.01)

(52) U.S. Cl. .................. 717/126; 717/124; 717/129; 717/143; 714/15

(58) Field of Classification Search ........ 717/124–129, 717/148, 114, 143, 173; 714/332, 38, 15; 711/6; 713/2, 200; 365/185.04
See application file for complete search history.

(56) References Cited

U.S. PATENT DOCUMENTS

| | | | | |
|---|---|---|---|---|
| 4,819,233 A * | 4/1989 | Delucia et al. | ............. | 717/129 |
| 5,668,999 A | 9/1997 | Gosling | ............. | 395/704 |
| 5,729,676 A | 3/1998 | Inoue | | |
| 5,740,441 A | 4/1998 | Yellin et al. | ............. | 395/704 |
| 5,748,964 A | 5/1998 | Gosling | ............. | 395/705 |
| 5,958,051 A * | 9/1999 | Renaud et al. | ............. | 713/200 |
| 6,026,016 A * | 2/2000 | Gafken | ............. | 365/185.04 |
| 6,092,147 A * | 7/2000 | Levy et al. | ............. | 711/6 |
| 6,247,171 B1 * | 6/2001 | Yellin et al. | ............. | 717/126 |
| 6,546,546 B1 * | 4/2003 | Van Doorn | ............. | 717/114 |
| 6,560,774 B1 * | 5/2003 | Gordon et al. | ............. | 717/146 |
| 6,581,159 B1 * | 6/2003 | Nevis et al. | ............. | 713/2 |
| 6,594,783 B1 * | 7/2003 | Dollin et al. | ............. | 714/38 |
| 6,601,114 B1 * | 7/2003 | Bracha et al. | ............. | 719/332 |
| 6,618,769 B1 * | 9/2003 | Bracha et al. | ............. | 719/332 |
| 6,684,391 B1 * | 1/2004 | Stroetmann | ............. | 717/148 |
| 6,802,061 B1 * | 10/2004 | Parthasarathy et al. | ............. | 717/173 |
| 2003/0154468 A1 * | 8/2003 | Gordon et al. | ............. | 717/143 |

FOREIGN PATENT DOCUMENTS

EP 1056008 11/2000

OTHER PUBLICATIONS

Songtao, Verify properties of mobile code, IEEE, Nov. 26-29, 2001 Page(s):440.*

(Continued)

*Primary Examiner*—Wei Y. Zhen
*Assistant Examiner*—Satish S. Rampuria (57) ABSTRACT

A code verification system is utilized to type check compiled code. The code verification system includes memory and a code verifier. The memory is utilized to store a compiled program. The code verifier analyzes instructions of the program and generates a plurality of type signatures based on the instructions The type signatures indicate the input type constraints and the output type descriptions of the instructions, and the code verifier analyzes the type signatures to detect a type error.

10 Claims, 6 Drawing Sheets

OTHER PUBLICATIONS

Subramanian et al., Automatic verification of object code against source code, IEEE, Jun. 17-21, 1996 Page(s):46-55.*

Aagaard et al., Verifying a logic-synthesis algorithm and implementation: a case study in software verification, IEEE, vol. 21, Issue 10, Oct. 1995 Pages(s):822-833.*

Ward, Code verification with the aid of MALPAS, IEEE, Jan. 8, 1991 Page(s):3/1-3/3.*

"Connected, Limited Device Configuration" Specification Version 1.0, Java 2 Platform Micro Edition, Sun Microsystems, May 19, 2000, pp. 5.5-5.10.

* cited by examiner

CODE VERIFICATION SYSTEM AND METHOD

BACKGROUND OF THE INVENTION

1. Field of the Invention

The present invention generally relates to code validation or verification techniques and, in particular, to a code verification system and method for checking compiled code for type errors.

2. Related Art

During compiling, computer code is often checked for errors before the computer code is allowed to execute. Such testing helps to ensure that data errors do not occur during execution. However, a set of computer code is not always compiled by a trusted source. For example, compiled computer code (e.g., bytecode) that is to be executed by a user's computer may be downloaded from an unknown or distrusted computer that compiled the code. Such a situation frequently occurs when a user utilizes the Internet. In this regard, it is common for on-line users of the Internet to download compiled code from distrusted servers and to execute the downloaded code on the user's computer.

Because the downloaded code may not be compiled by a trusted source, it is possible for that code to contain errors that are detectable via proper error checking typically performed during compilation. These errors may be inadvertent, such as, for example, when inadvertent data transmission errors occur during the downloading process, or the errors may be intentional, such as, for example, when a hacker intentionally introduces errors into the code in an attempt compromise the operation or security of the user's computer. Thus, when compiled computer code is downloaded into a user's computer for execution on the user's computer, it is often desirable to check the code to ensure that the code does not contain certain potential data errors, particularly when the compiled code is downloaded from a distrusted source. Such checking is sometimes referred to as "code verification" or "code validation" and is normally performed before the downloaded code is executed.

Note that cryptographic signing of code may be utilized to identify whether or not downloaded code has been transmitted from a trusted source. In this regard, if downloaded code has been signed by a source that the user's computer recognizes as a trusted source, then performing code verification on the downloaded code may not be necessary. However, if the downloaded code does not include such a signature, then it may be desirable for the user's computer to perform code verification on the code before executing the code.

An important test typically performed by code verification is type checking. In type checking, code is analyzed to ensure that each consuming instruction of the code will at least be provided with inputs (e.g., arguments) of the correct type. In this regard, it is well known that values processed by a computer are typically assigned a type and that certain instructions should only execute based on particular types of inputs. Typical examples of different value types include, but are not limited to, "int," "floating," "double," "String," etc. As an example, an add instruction may require two "int" inputs for execution. If, during execution, the add instruction is provided an input of a different type (e.g., "double"), an execution error may occur. Thus, in type checking, potential errors caused by instructions being provided wrong types of inputs are detected.

Note that in object-oriented programming languages (e.g., C++ or JAVA), a value type may be a class that is defined within the program. Further, a class may be extended or derived by various subclasses. If an instruction should receive an input of a particular class during execution, then an error should not occur if the instruction is provided an argument of the particular class or of a sub-class of the particular class. However, if it is determined in performing code verification that the instruction, when executed, will be provided with an input of a different class or type, then a potential type error should be detected by the code verification process. Otherwise, the instruction should pass the type checking performed by the code verification process.

In conventional computers, code verification of compiled code is often achieved by performing a symbolic execution (i.e, a simulation) of the compiled code before actually executing the code. Such code verification is generally described in U.S. Pat. Nos. 5,740,441; 5,668,999; and 5,748,964, which are incorporated herein by reference. During symbolic execution, determinations can be made as to which types of values are symbolically pulled from and pushed to the computer's stack for each symbolically executed instruction. An error is detected if it can be determined that an instruction is provided with a wrong type of input during the symbolic execution.

SUMMARY OF THE INVENTION

Generally, the present invention provides a code verification system and method for type checking compiled code.

In architecture, the code verification system of the present invention utilizes memory and a code verifier. The memory is utilized to store a compiled program. The code verifier analyzes instructions of the program and generates a plurality of type signatures based on the instructions. The type signatures indicate the input type constraints and the output type descriptions of the instructions, and the code verifier analyzes the type signatures to detect a type error.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the present invention pertains to an efficient code verification system and method. The code verification system creates a type signature for each instruction within a set of code. As used herein, a "type signature" of an instruction is a set of information that indicates the input type constraints and the output type description of the instruction. The input type constraints indicate the types of inputs, if any, that are required for proper execution of the instruction, and the output type description indicates the types of output values, if any, that are produced via execution of the instruction. After formation of the type signatures for the instructions of the code, the type signatures are composed together. During composition of two signatures, the two signatures are checked for any detectable type inconsistencies between the two signatures. If no type inconsistencies are detected, then the composition of the two signatures is allowed to complete successfully. However, if any type inconsistencies are detected, then an indication is generated that the code fails the code verification process, and execution of the code is prevented.

Figure 1:
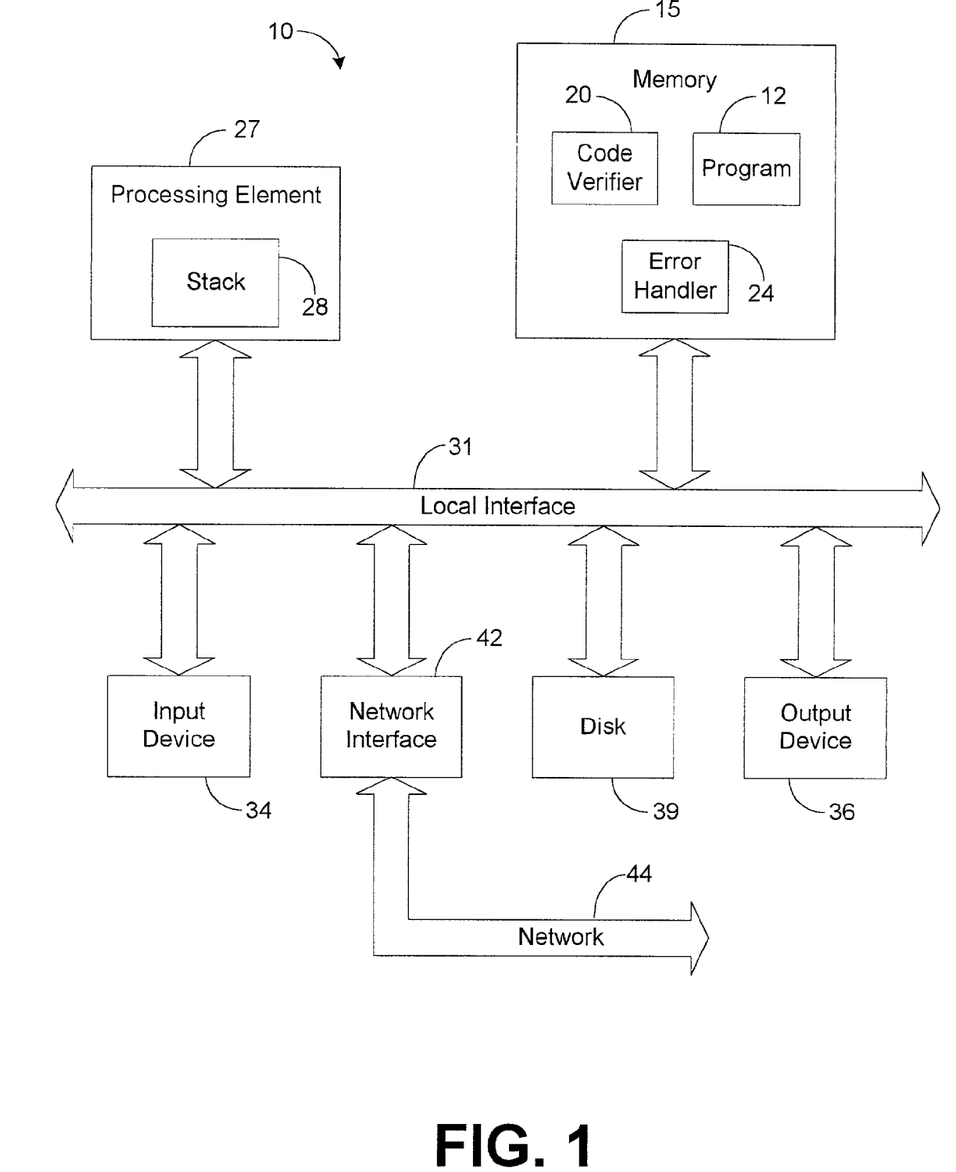
FIG. 1 is a block diagram illustrating a computer system employing an embodiment of a code verifier in accordance with the present invention.

FIG. 1 depicts a computer system 10 in accordance with the present invention. The system 10 includes a compiled program 12 (e.g., bytecode) stored in memory 15. The program 12 may have been compiled by another system (not shown) and downloaded into the system 10 via well-known techniques. Thus, it may be desirable to perform code verification on the program 12. To this end, a code verifier 20 is configured to perform code verification on the program 12 and, more specifically, to check the program 12 for any detectable type errors. If such an error is detected, the code verifier 20 preferably invokes an error handler 24, which handles any detected type errors according to a predefined algorithm.

The code verifier 20 and the error handler 24 can be implemented in software, hardware, or a combination thereof In the preferred embodiment, as illustrated by way of example in FIG. 1, the code verifier 20 and the error handler 24, along with their associated methodologies, are implemented in software and stored in memory 15.

Note that the code verifier 20 and/or the error handler 24, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the code verifier 20 and/or the error handler 24 may be magnetically stored and transported on a conventional portable computer diskette.

The preferred embodiment of the system 10 of FIG. 1 comprises one or more conventional processing elements 27, such as a digital signal processor (DSP) or a central processing unit (CPU), for example, that communicate to and drive the other elements within the system 10 via a local interface 31, which can include one or more buses. The processing element 27 may include a last-in, first-out (LIFO) memory element 28, referred to as a "stack," for temporarily storing values being processed by the processing element 27.

The system 10 may also include an input device 34, for example, a keyboard or a mouse, that can be used to input data from a user of the system 10, and an output device 36, for example, a screen display or a printer, can be used to output data to the user. A disk storage mechanism 39 can be connected to the local interface 31 to transfer data to and from a nonvolatile disk (e.g., magnetic, optical, etc.). The system 10 can be connected to a network interface 42 that allows the system 10 to exchange data with a network 44, such as the Internet, for example.

Figure 2:
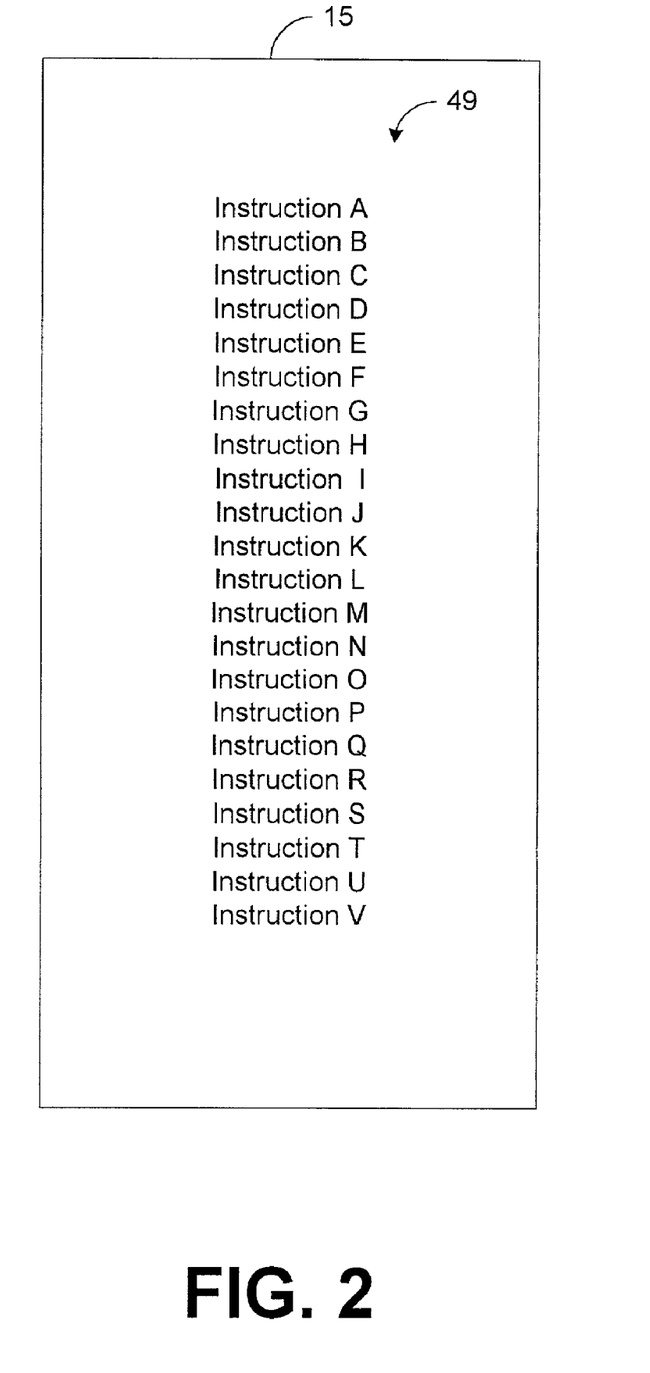
FIG. 2 is a block diagram illustrating a set of compiled computer code stored in memory within the system of FIG. 1.

FIG. 2 depicts a more detailed view of a set of code 49 within the program 12 that is stored in memory 15. It is well-known that a program 12 is typically comprised of parts known as "methods," "functions," or "procedures," and the set of code 49 is one such part. Moreover, well-known techniques for checking the invocation of such parts currently exist, and the present invention generally pertains to checking the code within such parts for type errors.

As shown by FIG. 2, the set of code 49 includes a plurality of instructions, presented as Instructions A–V. The instructions may comprise any set of compiled instructions from a known programming language (e.g., C, C++, Java, Fortran, etc.). Note that the code 49 can include any number of instructions, and the number of instructions shown in FIG. 2 has been arbitrarily selected for illustrative purposes only.

Figure 3:
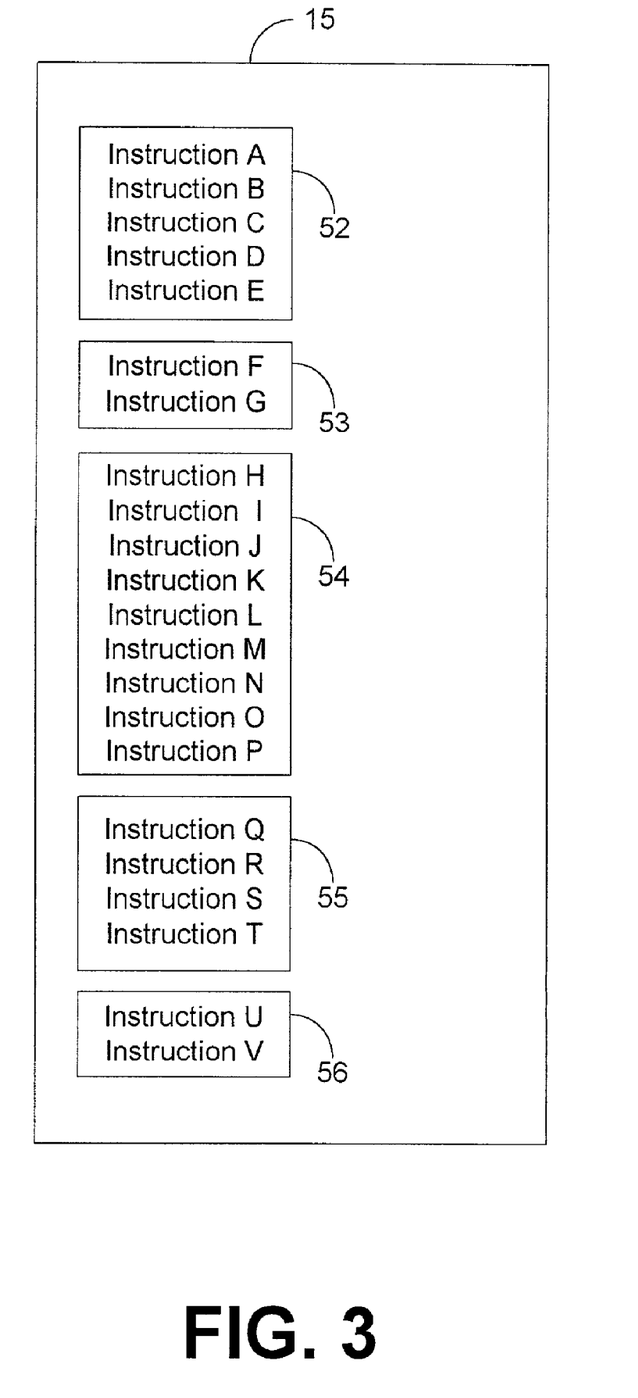
FIG. 3 is a block diagram illustrating the code of FIG. 2 after the code has been subdivided by the code verifier of FIG. 1.

To check the compiled code 49 for type errors, the code verifier 20 first analyzes the code 49 and determines the program flow of the code 49 via conventional techniques. While analyzing the code 49, the code verifier 20 groups the instructions into different code blocks 52–56, which are shown in FIG. 3. Each block 52–56 preferably includes one or more instructions that will successively execute at run time. Thus, if the first instruction of a block 52–56 is executed at run time, then each of the other instructions in the same block 52–56 will successively execute after the first instruction.

Note that a conditional branch instruction causes the program flow to branch to one of a plurality of possible instructions, depending on the machine state of system 10 at run time. Thus, during the code verification process, it cannot be determined which instruction will successively execute, at run time, after a conditional branch instruction. Therefore, if a block 52–56 includes a conditional branch instruction, then the block 52–56 is preferably defined (i.e., the boundaries of the block 52–56 are preferably set) such that the conditional branch instruction is the last instruction of the block 52–56. Moreover, to ensure that each of the code blocks 52–56 includes only successive instructions, any single code block 52–56 preferably does not include more than one conditional branch instruction. Further note that techniques for determining the program flow of the code 49 and for subdividing the code 49 into various code blocks 52–56 are generally described in U.S. patent application entitled, "Code Verification by Tree Reconstruction," assigned Ser. No. 09/384,812, and filed on Aug. 27, 1999, which is incorporated herein by reference. Also note that many conventional techniques exist for analyzing and determining information pertaining to a program's control flow, and such techniques may be employed to perform the foregoing functionality. *Connected Limited Device Configuration,* Specification Version 1.0, Java 2 Platform Micro Edition, Sun Microsystems, 2000, which is incorporated herein by reference, describes the type of information provided by one conventional process for analyzing the control flow of programs.

Therefore, after the code verifier has analyzed the code 49 as described above, the code 49 should be subdivided or grouped into a plurality of code blocks 52–56, as shown by FIG. 3, and the code verifier 20 should be aware of the order that the blocks 52–56 will execute at run time. For illustrative purposes, assume that the program flow determined by the code verifier 20 indicates that block 52 will execute first at run time. Then, block 54 will execute followed by block 53. Finally, block 55 will execute followed by block 56.

Figure 4:
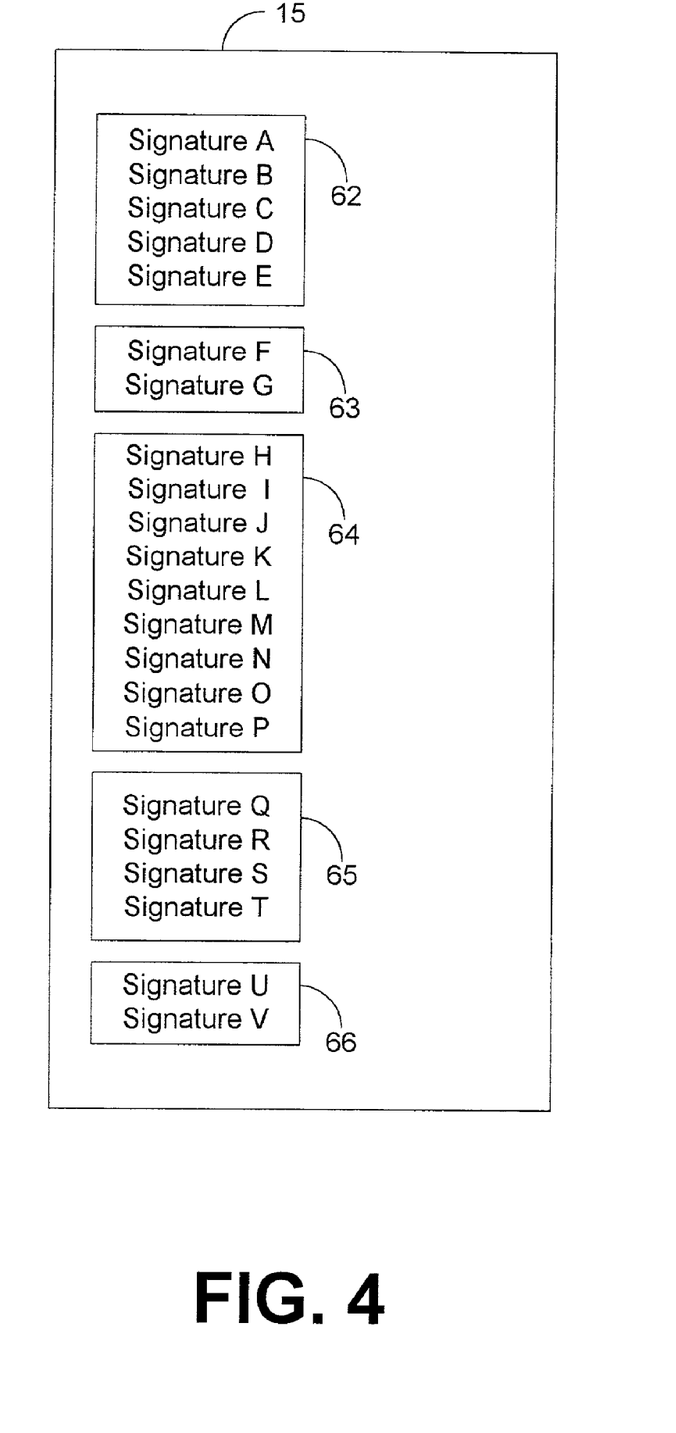
FIG. 4 is a block diagram illustrating type signatures that have been translated from the code depicted in FIG. 3.

In addition to subdividing the code 49 as described above, the code verifier 20 also analyzes each instruction of the code 49 and translates each instruction of the code 49 into a corresponding type signature of the instruction. Thus, the code blocks 52–56 are respectively translated into type signature blocks 62–66, which are depicted by FIG. 4.

The type signature for an instruction preferably indicates what types of inputs, if any, the code verifier 20 expects the instruction to consume, when executed, and the type signature preferably indicates what types of outputs, if any, the code verifier 20 expects the instruction to produce when executed. Further, if the instruction refers to a memory location of variable type (e.g., fetches or updates the location's value), then the type signature may indicate the address of that variable and the type that is required. As known in the art, a location is a said to have variable type if it is permitted for that variable to be used as several unrelated types during its lifetime. For example, the local variables of methods Java machine code are of variable type.

As an example, assume that Instruction D of the code 49, when executed by processing element 27, consumes a value stored in a first memory address of variable type and consumes another numerical value. Also assume that Instruction D produces a numerical value that is to be stored to a second memory address of variable type and produces another numerical value. Further assume that the code verifier 20 determines that the numerical values consumed by Instruction D are both of the type "double" and that the numerical values produced by Instruction D are both of the type "int." An example of such an instruction may be a division instruction that divides one of the consumed values by the other of the consumed values and that writes the result of division operation to the second memory address while pushing any remainder to the stack 28.

In generating a type signature for the foregoing instruction, the code verifier 20 preferably produces data indicating that, during execution of the instruction, a numerical value of type "double" is consumed from the stack 28 and that, during execution of the instruction, a numerical value of type "double" is consumed from the first memory address. The data preferably also indicates that, during execution of the instruction, a numerical value of type "int" is produced and pushed to the stack 28, and the data preferably indicates that, during execution of the instruction, a numerical value of type "int" is produced and stored in the second memory address.

The type signatures generated by the code verifier 20 may be expressed via a variety of syntactical expressions. As an example, the syntactical expressions that define the type signatures produced by the code verifier 20 may adhere to the following formula:

$$\text{inBind}|\text{inType}\rightarrow\text{outType}|\text{outBind}$$

where inBind represents the type descriptions of consumed variables, inType represents the type descriptions of values consumed from the stack 28, outBind represents the type descriptions of produced variables, and outType represents the type descriptions of produced values pushed to the stack 28. Note that inBind and outBind may be expressed as v:T where v indicates the address of a variable and T indicates the variable's type.

To illustrate the foregoing syntactical formula according to the example of Instruction D described above, assume that the address of the variable consumed by Instruction D is "0001" and that the address of the variable produced by instruction D is "0010." In such an example, the type signature of instruction D may be expressed as:

$$0001{:}\text{double}|\text{double}\rightarrow\text{int}|0010{:}\text{int}.$$

Note that there are other types of syntaxes that may be utilized in generating the type signatures of the instructions in the code 49, and the syntax employed herein to represent the type signatures of the code 49 is presented for illustrative purposes only.

In another example, assume that an instruction consumes no variables and two numerical values of type "int." Also assume that the instruction only produces a numerical variable of type "double" that is to be stored at address "1000." In such an example, the type signature of the instruction could be expressed as:

$$|\text{int, int}\rightarrow|1000{:}\text{double}.$$

Note that the empty space in inBind (i.e., in front of "|int, int") indicates that there are no consumed variables, and the presence of empty space in outType (i.e., between "→" and "|1000:double") indicates that there are no products that are to be pushed to the stack 28. Furthermore, the comma after the first "int" indicates that there is another value, in addition to the first "int," consumed by the instruction. More specifically, the second "int" (i.e., the "int" that follows the comma) indicates that the other value consumed from the stack 28 is also of the type "int."

Also note that the position of an input value's type description within inType indicates the position of that value on the stack 28 before execution of the instruction, and the position of an output value's type description within outType indicates the position of that value on the stack 28 after execution of the instruction, regardless of any order of pulling and pushing values during actual execution of the instruction. In this regard, the rightmost type description in inType corresponds to the topmost value on the input stack (i.e., the stack 28 prior to execution of the instruction), with each step left in inType corresponding to the next deeper value on the input stack. In addition, the rightmost type description in outType corresponds to the topmost value on the output stack (i.e., the stack 28 after execution of the instruction), with each step left in outType corresponding to the next deeper element on the output stack. Note that additional values underneath those described by inType in the input stack and underneath those described by outType in the output stack are preserved unchanged by the instruction.

To illustrate the foregoing, assume that an instruction has the following type signature:

|String, int→double, float|.

Such an instruction expects a value of type "int" on top of the input stack and a value of type "String" immediately underneath the foregoing "int" value. Both of these values are consumed by the instruction and are replaced by two other values, one of type "float" on top of the output stack and another of type "double" immediately underneath the foregoing "float" value.

Figure 5:
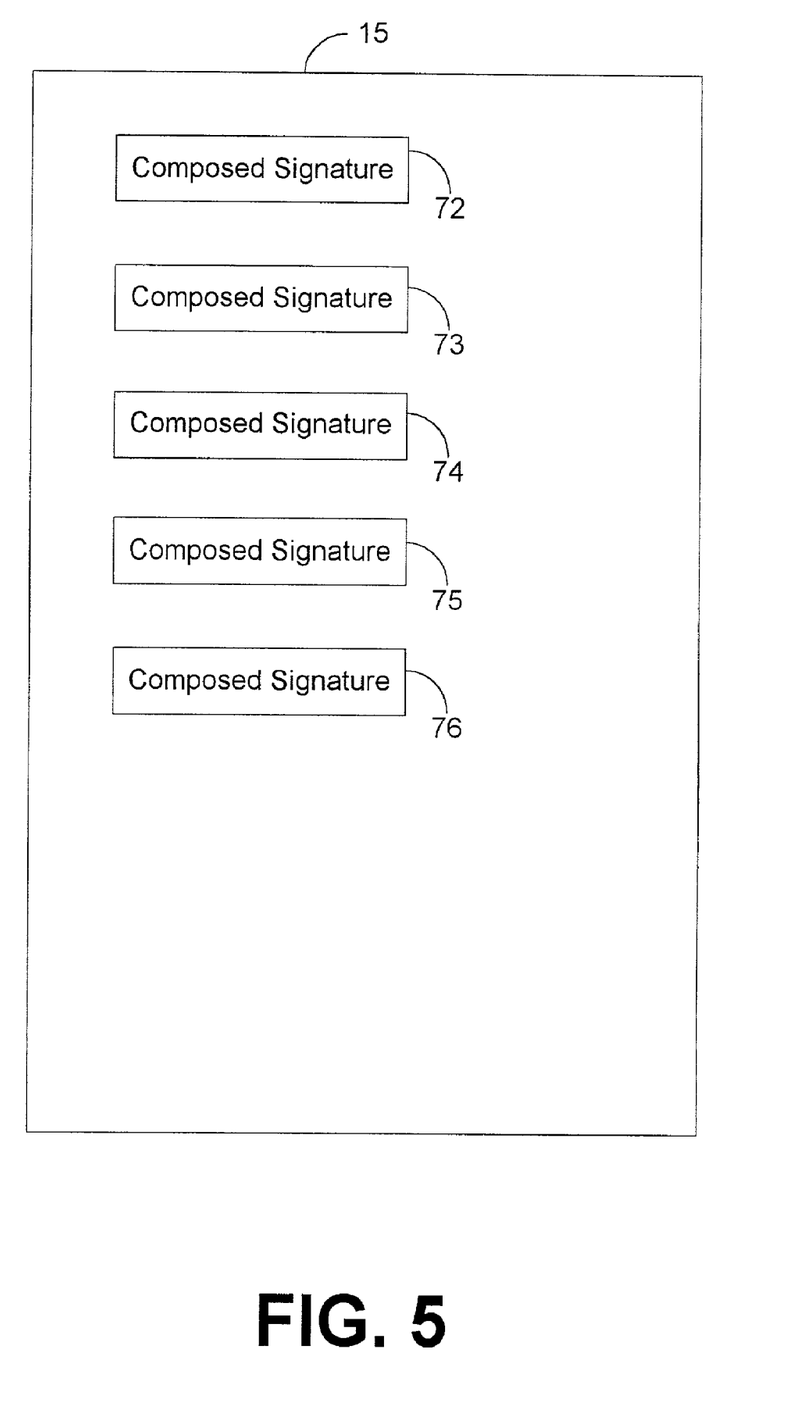
FIG. 5 is a block diagram illustrating the composed signatures generated by the code verifier of FIG. 1 in composing the type signatures depicted in FIG. 4.

Once the code verifier 20 has defined the type signatures for the instructions of the code 49, the code verifier 20 is designed to compose the type signatures for each individual block 62–66 into a single type signature that represents a final type signature for the individual block. For example, the code verifier 20 composes the type signatures of block 62 (FIG. 4) into a single composed type signature, referred to as Composed Signature 72 in FIG. 5. The code verifier 20 also composes the type signatures of blocks 63–66 into single type signatures, respectively referred to as Composed Signatures 73–76 in FIG. 5.

To compose a type signature block 62–66, the code verifier 20 is designed to compose only successive type signatures. Note that two signatures are "successive" only if one of the signatures has been derived from an instruction that is successive, according to the program flow of the code 49, with an instruction from which the other signature has been derived.

As an example, assume that Instructions A–C of FIG. 3 are respectively translated into Type Signatures A–C. In this example, Instructions A and B are successive and Instructions B and C are successive. In this regard, during execution, Instruction B will be executed immediately after Instruction A, and Instruction C will be executed immediately after Instruction B. Moreover, Type Signature A is derived from Instruction A, and Type Signature B is derived from Instruction B. Further, Instructions A and B are successive. Thus, Type Signatures A and B are successive and, therefore, may be composed. However, Instructions A and C are not successive, and it would, therefore, be improper to compose Type Signature A directly with Type Signature C, which is derived from Instruction C.

In composing block 62, assume that the code verifier 20 composes Type Signature A with Type Signature B to form a resulting composed signature. This resulting composed signature has been derived from Type Signatures A and B and, therefore, from Instructions A and B. Further, since Instructions B and C are successive, the resulting composed signature is successive with and, therefore, may be composed with Type Signature C. Once all of the signatures of block 62 have been composed into a single composed signature, the composition of block 62 is complete.

By performing the aforedescribed techniques for each signature block 62–66, the code verifier 20 translates the blocks 62–66 into single composed signatures 72–76, respectively. The code verifier 20 then composes signatures 72–76 into a single composed signature utilizing techniques similar to those previously described for blocks 62–66. The code verifier 20 may compose the signatures 72–76 in any order provided that only successive signatures are composed during the composition process.

When composing two type signatures, the code verifier 20 is designed to determine whether the output type descriptions of the earlier type signature are acceptable to the input type constraints of the later type signature. Note that a type signature is earlier than another type signature if it is the signature of an instruction or of instructions that are earlier in the program flow than the instruction or instructions of the other type signature. Furthermore, the output type descriptions of an earlier type signature are acceptable to the input type constraints of the later type signature if no type errors can be detected by comparing the input type constraints to the output type descriptions.

In this regard, in composing two type signatures, the code verifier 20 may compare a type description in outType of the earlier type signature to a corresponding type description in inType of the later signature. A type description in outType of the earlier signature "corresponds" to a type description in inType of the later signature if the two type descriptions refer to the same stack value. For example, assume that, by analyzing a first instruction, it can be determined that the first instruction pulls a value of type "type1" from the stack 28. Also, assume that it can be determined that the instruction pushes a value of type "type2" to the stack 28 and then pushes a value of type "type3" to the stack 28. Further assume that, by analyzing the next successive instruction, it can be determined that the next successive instruction pulls a value of "type4" from the stack 28 and then pulls a value of "type5" from the stack 28. It can also be determined that this instruction pushes a value of type "type6" to the stack 28. Note that "type1" to "type6" each represent a type or class, such as "int," "String," etc.

The two instructions may be translated into two type signatures represented as:

|type1→type2, type3|

|type5, type4→type6|.

In this example, "type2" and "type5" refer to the same stack value (i.e., the first value pushed to the stack by the earlier instruction) and, therefore, "correspond" to one another. Further, "type3" and "type4" refer to the same stack value (i.e., the second value pushed to the stack 28 by the earlier instruction) and, therefore, "correspond" to one another.

Note that by following the composition techniques that will be described in further detail hereafter, corresponding type descriptions in inType of the later type signature and outType of the earlier type signature preferably occupy the same position in inType and outType from the right. Another way of expressing this is if inType is represented as a series of type descriptions $U_1$ through $U_n$ from left to right and if outType is represented as a series of type descriptions $T_1$ through $T_m$ from left to right (in which n and m are integer values of equal or unequal values), then $U_i$ corresponds to $T_j$ if n−i=m−j. Moreover, in the foregoing example, "type3" occupies the rightmost position in outType of the earlier signature, and "type4" occupies the rightmost position in inType of the later signature. Thus, "type3" and "type4" occupy the same position from the right in outType of the earlier signature and inType of the later signature respectively. As a result, it can be determined by analyzing the foregoing signatures that "type3" corresponds to "type4."

Similarly, both "type2" and "type5" occupy the second rightmost position in outType of the earlier signature and in inType of the later signature, respectively. Thus, it can be determined by analyzing the foregoing signatures that "type2" corresponds to "type5." Moreover, the code verifier 20 determines whether a type description in outType of a first signature corresponds to a type description in inType of a next successive signature by merely analyzing the positions of the type descriptions in inType and outType, as described above.

Note that if the earlier signature fails to include a type description in the same position of outType as a type description in inType of the later signature, then there is no corresponding type description in the outType of the earlier signature for the foregoing inType type description. Such an inType type description is not checked for type errors during a composition of the two signatures. Further, if the later signature fails to include a type description in the same position of inType as a type description in outType of the earlier signature, then there is no corresponding type description in the inType of the later signature for the foregoing outType type description. Such an outType type description is not checked for type errors during a composition of the two signatures.

As previously set forth, when composing two successive signatures, the code verifier 20 compares a type description in outType of the earlier signature to a corresponding type description in inType of the later signature. More specifically, the code verifier 20 determines whether the type description in outType of the earlier signature is acceptable to the corresponding type description in inType of the later signature such that no type errors are detectable. In this regard, a first type description is acceptable to a second type description if an instruction can produce a value of a type described by the first type description and if another instruction designed to utilize a value of a type described by the second type description can utilize the produced value without generating a type error.

For example, it is well known in Java that "Integer" and "String" are both subtypes of the class "Object." As a result, an instruction that is designed to consume an input of type "Object" may, without causing a type error, consume the product of an instruction that produces a "String" or may consume the product of an instruction that produces an "Integer." Therefore, both an "Integer" type description and a "String" type description are acceptable to an "Object" type description.

It is also well known in Java that "int" and "double" are of different classes. Moreover, an instruction that is designed to consume an input of type "int" may not consume, without causing a type error, an input of type "double." Therefore, an "int" type description is not acceptable to a "double" type description.

When two signatures are being composed and when a type description in outType of the earlier signature corresponds to a type description in inType of the later signature, the type description in outType of the earlier signature is type checked against the corresponding type description in inType of the later signature, and the two corresponding type descriptions are then removed (i.e., do not appear in the composed signature). Further, when a type description in outType of the earlier signature does not correspond to a type description in inType of the later signature, the type description in outType of the earlier signature appears in outType of the composed signature, and when a type description in inType of the later signature does not correspond to a type description in outType of the earlier signature, the type description in inType of the later signature appears in inType of the composed signature.

In addition, when composing two signatures, the code verifier 20 simply inserts, into the composed signature, the type descriptions of inType for the earlier signature and the type descriptions of outType for the later signature. More specifically, the code verifier 20 inserts each type description of inType from the earlier signature into the inType of the composed signature, and the code verifier 20 inserts each type description of outType from the later signature into the outType of the composed signature.

Accordingly, in the example described above, the two signatures could be successfully composed if "type2" is acceptable to "type5" and if "type3" is acceptable to "type4." If the foregoing is true, then the composed signature should be:

|type1→type6|.

In another example, assume that four successive type signatures, from earliest to latest, are expressed as:

|type1→type2, type3|  (Signature A.1)

|type4→type5|  (Signature B.1)

|type6→|  (Signature C.1)

|type7→|  (Signature D.1)

in which "type1" to "type7" each represents a type description, such as "int," "String," etc. In this example, Signature A.1 indicates that a value of type "type1" is replaced by values of types "type2" and "type3" in that order. Signature B.1 indicates that a value of type "type4" is replaced by a value of type "type5." Signature C.1 indicates that a value of type "type6" is consumed, with no new value generated. Similarly, Signature D.1 indicates that a value to type "type7" is consumed.

To compose Signatures A.1 and B.1, the code verifier 20 first determines that "type3" corresponds to "type4" by virtue of their respective positions in outType of the earlier signature and inType of the later signature. Thus, the code verifier 20 checks to determine whether "type3" is acceptable to "type4." If "type3" is not acceptable to "type4," then the code verifier 20 detects an error. Otherwise, the code verifier 20 fails to detect an error, and the composition may occur. The composed signature may be represented as:

|type1→type2, type5|.

This composed signature may then be composed with Signature C.1. To compose these two signatures, the code verifier 20 first determines that "type5" corresponds to "type6" by virtue of their respective positions in outType of the earlier signature and inType of the later signature. Thus, the code verifier 20 checks to determine whether "type5" is acceptable to "type6." If "type5" is not acceptable to "type6," then the code verifier 20 detects an error. Otherwise, the composition may occur, and the composed signature may be represented as:

|type1→type2|.

This composed signature may then be composed with Signature D.1. To compose these two signatures, the code verifier 20 first determines that "type2" corresponds to "type7" by virtue of their respective positions in outType of the earlier signature and inType of the later signature. Thus, the code verifier 20 checks to determine whether "type2" is acceptable to "type7." If "type2" is not acceptable to "type7," then the code verifier 20 detects an error. Otherwise, the code verifier 20 fails to detect an error, and the composition may occur. The composed signature should be represented as:

|type1→|.

Note that it is not necessary for the signatures to be composed in the above-described order provided that only successive signatures are composed. For example, as described above, the code verifier 20 may first compose Signature A.1 with Signature B.1 to produce a first composed signature represented as:

|type1→type2, type5|.

After forming the first composed signature, the code verifier may form a second composed signature by composing Signature C.1 with Signature D.1. The second composed signature may be expressed as:

|type6, type7→|.

The first and second composed signatures may then be composed together via the code verifier 20. To compose these two signatures, the code verifier 20 determines that "type5" corresponds to "type7" by virtue of their respective positions in outType of the earlier signature and inType of the later signature. The code verifier 20 also determines that "type2" corresponds to "type6" by virtue of their respective positions in outType of the earlier signature and inType of the later signature. Thus, the code verifier 20 determines whether "type5" is acceptable to "type7" and whether "type2" is acceptable to "type6." If "type5" is not acceptable to "type7" or if "type2" is not acceptable to "type6," then the code verifier 20 detects an error. However, if "type5" is acceptable to "type7" and if "type2" is acceptable to "type6," then no error is detected, and the composition is allowed. The composition of the first and second composed signatures should yield:

|type1→|.

Thus, the same result is effectively reached in both of the foregoing examples even though the signatures were composed in a different order.

In composing two signatures, the code verifier 20 also checks for consistency between type descriptions of any local variables included in the type signatures. For example, assume that a signature indicates that a value of a particular type is stored to a local variable. If another signature indicates that this same value is later retrieved from the local variable, then the particular type indicated by the former signature should be acceptable to the type description of the value, as indicated by the other signature.

To achieve the foregoing in the preferred embodiment, the code verifier 20 analyzes the inBind and outBind of type signatures during composition. In this regard, the code verifier 20, when composing two signatures, compares the type descriptions in the inBind of the later signature to the type descriptions in the outbind of the earlier signature. If a type description for a variable is present in the inBind of the later signature and if a type description for the same variable is present in the outBind of the earlier signature, then the two type descriptions should be consistent. In this regard, if the foregoing outBind type description is unacceptable to the foregoing inBind type description, then the code verifier 20 detects an error. Otherwise, the composition is allowed to continue without detecting an error.

Moreover, when the inBind of the later signature and the outBind of the earlier signature have acceptable type descriptions for the same variable, the code verifier 20 fails to include, in the resulting composed signature, the type description from the inBind of the later signature. However, the code verifier 20 inserts, in the outBind of the resulting composed signature, the type description from the outBind of the earlier signature, unless the later signature includes a type description for the same variable in outBind as well. If the later signature includes a type description for the same variable in outBind, then the code verifier 20 inserts the type description from the outBind of the later signature instead of the type description from the outBind of the earlier signature. In such a case, it is not necessary for the code verifier 20 to check for consistency between the variable's type description in outBind of the earlier signature and the variable's type description in outBind of the later signature.

In addition, if type descriptions for the same variable are present in both the outBind of the earlier signature and the outBind of the later signature and if a type description for the same variable is not present in the inBind for the later signature, then the code verifier 20 simply includes the type description of the later signature in the outBind of the resulting composed signature. The type signature of the earlier signature is not included in the resulting composed signature. In such a case, the code verifier 20 checks for consistency between the two type descriptions of the earlier and later signatures. In this regard, if the type description of the earlier signature is unacceptable to the type description of the later signature, then the code verifier 20 detects an error. Otherwise, the composition is allowed to continue without detecting an error.

Furthermore, if the inBind of both the earlier and later signatures have type descriptions for the same variable and if the outBind of the earlier signature does not have a type description for this variable, then the code verifier 20 simply includes the type description of the earlier signature in the inBind of the resulting composed signature. The type signature of the later signature is not included in the resulting composed signature. In such a case, the code verifier 20 checks for consistency between the two type descriptions of the earlier and later signatures. In this regard, if the type description of the earlier signature is unacceptable to the type description of the later signature, then the code verifier 20 detects an error. Otherwise, the composition is allowed to continue without detecting an error.

If one of the foregoing conditions does not occur for a particular type description in the inBind of either the earlier or later signature, then the code verifier 20 includes, in the inBind of the resulting composed instruction, the particular type description. Further, if one of the foregoing conditions does not occur for a particular type description in the outBind of either the earlier or later signature, then the code verifier 20 preferably includes, in the outBind of the resulting composed instruction, the particular type description.

To illustrate the foregoing techniques for handling type descriptions in the inBind and outBind of signatures being composed, assume that a block of consecutive instructions consumes and produces values according to the following description.

A first instruction consumes two values from the stack 28 and produces a value for a first variable that is stored in a first memory location (e.g., memory location "0001"). The second instruction then consumes the value of the first variable that is stored in memory location "0001" and produces a value that is pushed to the stack 28. This instruction also produces a value for a second variable that is stored in a second memory location (e.g., memory location "0010"). A third instruction then consumes a value from the stack 28 and produces another value for the second variable. Then, a fourth instruction consumes the value of the first variable that is stored in memory location "0001" and produces two values that are pushed to the stack 28. A final instruction then consumes the value of the second variable that is stored in memory location "0010" and further consumes a value from the stack 28. This final instruction also produces a value for the first variable.

The type signatures of the foregoing set of instructions may be expressed as:

|type1, type2→|0001:type3             (Signature A.2)

0001:type4|→type5|0010:type6            (Signature B.2)

|type7→|0010:type8             (Signature C.2)

0001:type9|→type10, type11|            (Signature D.2)

0010:type12|type13→|0001:type14            (Signature E.2), where "type1" to "type14" each represents a type description, such as "int," "String," etc. Although the foregoing type signatures can be composed in different orders, as previously described, assume that the code verifier 20 composes these signatures from the latest to the earliest (i.e., from Signature E.2 to Signature A.2). Thus, the code verifier 20 first composes Signature E.2 with signature D.2.

In composing these two signatures, the code verifier 20 determines that "type11" corresponds with "type13." Thus, the code verifier 20 checks to determine whether "type11" is consistent with or, in other words, acceptable to "type13." If these type descriptions are inconsistent, then the code verifier 20 detects an error. Otherwise, the composition is allowed to proceed.

In performing the composition, the code verifier 20 includes, in the inBind of the composed signature, the type description from the inBind of Signature D.2 and the type description from the inBind of Signature E.2. The code verifier 20 also includes, in the outBind of the composed signature, the type description from the outBind of Signature E.2. There is no need for the code verifier 20 to perform any consistency checks between any of these type descriptions. The composed signature may be expressed as:

0001:type9, 0010:type12|→type10|0001:type14.

The code verifier 20 then composes this composed signature with Signature C.2. The inBind of the foregoing composed signature includes a type description for the second variable, and the outBind of Signature C.2 (i.e., the earlier signature in this composition) includes a type description for the same variable. Thus, in performing the composition, the code verifier 20 determines whether these type descriptions are consistent. More specifically, the code verifier 20 determines whether "type8" is acceptable to "type12." If "type8" is unacceptable to "type12," then the code verifier 20 detects an error. Otherwise, the code verifier 20 allows the composition to proceed. Note that if the composition proceeds, there is no need to include the foregoing inBind type description in the newly composed signature. Such a newly composed signature may be expressed as:

0001:type9|type7→type10|0001:type14, 0010:type8.

The code verifier 20 then composes this composed signature with Signature B.2. In this composition, "type5" corresponds with "type7," and the code verifier 20, therefore, determines whether "type5" is acceptable to "type7." If "type5" is unacceptable to "type7," then the code verifier 20 detects an error. Otherwise, the code verifier 20 allows the composition to continue.

In performing the foregoing composition, the code verifier 20 determines that the inBind of the earlier signature (i.e., Signature B.2) includes a type description of a variable (i.e., the variable associated with address "0001"), and the code verifier 20 determines that the inBind of the later signature (i.e., the foregoing composed signature) includes a type description for the same variable. Therefore, the code verifier 20 checks these type descriptions for consistency. More specifically, the code verifier 20 determines whether "type4" is acceptable to "type9." If "type4" is unacceptable to "type9," then the code verifier 20 detects an error. Otherwise, the code verifier 20 allows the composition to continue and includes, in the inBind of the resulting composed signature, the type description (i.e., "0001:type4") from the earlier signature and discards the type description (i.e., "0001:type9") from the later signature.

In addition, the code verifier 20 should also determine that the outBind of the earlier signature (i.e., Signature B.2) includes a type description of a variable (i.e., the variable associated with address "0010"), and the code verifier 20 should determine that the outbind of the later signature (i.e., the foregoing composed signature) includes a type description for the same variable. Therefore, the code verifier 20 checks these type descriptions for consistency. More specifically, the code verifier 20 determines whether "type6" is acceptable to "type8." If "type6" is unacceptable to "type8," then the code verifier 20 detects an error. Otherwise, the code verifier 20 allows the composition to continue and includes, in the outbind of the resulting composed signature, the type description (i.e., "0010:type8") from the later signature and discards the type description (i.e., "0001:type6") from the earlier signature. The newly composed signature may be expressed as:

0001:type4|→type10|0001:type14, 0010:type8.

The code verifier 20 then composes this composed signature with Signature A.2. In this composition the outBind of the earlier signature (i.e., Signature A.2) includes a type description for the variable associated with address "0001," and the inbind of the later signature (i.e., the foregoing composed signature) includes a type description for this same variable. Therefore, the code verifier 20 checks these type descriptions for consistency. More specifically, the code verifier 20 determines whether "type3" is consistent with or, in other words, acceptable to "type4." If "type3" is unacceptable to "type4," then the code verifier 20 detects an error. Otherwise, the code verifier 20 allows the composition to continue. Note that the code verifier 20 does not check for consistency between "type3" and "type8." The newly composed signature, which is the resulting signature for the entire signature block, can be expressed as:

|type1, type2→type10|0001:type14, 0010:type8.

At this point the composition for the signature block is complete.

It is well-known that some instructions may consume or produce a value, wherein the type of the value is indicated by a type variable. Such a value cannot be assigned a particular type description by simply analyzing the instruction that consumes or produces the value. However, it is still possible to check for type errors associated with the value by comparing the type variable to type descriptions of other signatures. An example of how such type checking may be performed will be described below.

In the preferred embodiment, the name of a type variable is used as the type variable's type description in its type signature. Thus, assume that an instruction consumes an input that has a type indicated by a type variable named "example," which is stored in a particular memory location, referred to as "0001." Also assume that the instruction pushes the foregoing value onto the stack 28. The type signature can be represented as:

0001:example|→example|.

When the type variable is checked for consistency against another type description during a composition, the name of the type variable is replaced with an arbitrary name, and this arbitrary name is correlated with the other type description. For example, assume that the next successive instruction, when executed, consumes a value from the stack 28 and that, by analyzing the next successive instruction, it can be determined that this value pulled from the stack 28 should be of a particular type, referred to as "type1." Note that "type1" may be any type or class, such as, for example, "String," "int," "double," etc. The type signature of the next successive instruction may be expressed as:

|type1→|.

In this example, the type variable "example" corresponds to the type description "type1" by virtue of their respective positions in outType of the earlier signature and in inType of the later signature. Thus, for there to be no type errors, the type variable "example" should be acceptable to "type1."

In composing the two signatures, the code verifier 20 may be configured to rename the type variable to an arbitrary name, such as "example1." Moreover, the code verifier 20 may express the composition of the two signatures as:

location1:example1|→example1:type1.

Thus, the code verifier 20 allows the composition to occur without detecting an error but indicates that there is a constraint on the type variable. More specifically, the term "example1:type1" indicates that the type variable of the signature is bound to "type1."

To illustrate the foregoing, assume that a block of consecutive instructions, when executed, consumes and produces values according to the following description.

A first instruction consumes a value from the stack 28 and produces a value that is stored in a first memory location (e.g., memory location "0001"). A second instruction then consumes a value having a type indicated by the type variable "example" from memory location "0001" and produces a value that is pushed to the stack 28. A third instruction then consumes a value from the stack 28 and produces a value that is stored to the memory location "0001." A fourth instruction consumes the a value having a type indicated by the type variable "example" from memory location "0001" and produces a value that is pushed to the stack 28. A final instruction then consumes a value from the stack 28 and produces a value that is stored in a second memory location (e.g., "0010").

The type signatures of the foregoing set of instructions may be expressed as:

| | |
|---|---|
| \|type1→\|0001:type2 | (Signature A.3) |
| 0001:example\|→example\| | (Signature B.3) |
| \|type3→\|0001:type4 | (Signature C.3) |
| 0001:example\|→example\| | (Signature D.3) |
| \|type5→\|0010:type6 | (Signature E.3), | where "type1" to "type6" each represents a type description, such as "int," "String," etc. Although the foregoing type signatures can be composed in different orders, as previously described, assume that the code verifier 20 composes these signatures from the latest to the earliest. Thus, code verifier 20 first composes Signature E.3 with Signature D.3.

In composing the two foregoing signatures, the code verifier 20 renames the type variable to an arbitrary name, such as "example1," and indicates that the type variable "example1" is bound to "type5." The resulting composed signature may be expressed as:

0001:example1|→|0010:type6 example1:type5.

The code verifier 20 then composes the foregoing signature with Signature C.3. In composing these signatures, the code verifier 20 determines whether "type4" is acceptable to "type5." If "type4" is unacceptable to "type5," then the code verifier 20 detects an error. However, if "type4" is acceptable to "type5," then the code verifier 20 fails to detect an error and allows the composition to continue. The resulting signature may be expressed as:

|type3→|0010:type6, 0001:type4.

The code verifier 20 then composes the foregoing signature with Signature B.3. In composing the two signatures, the code verifier 20 renames the type variable "example" of Signature B.3 to an arbitrary name, such as "example2," and indicates that "example2" is bound to "type3." The resulting composed signature may be expressed as:

0001:example2|→|0010:type6, 0001:type4 example2:type3.

The code verifier 20 then composes the foregoing signature with Signature A.3. In composing these signatures, the code verifier 20 determines whether "type2" is acceptable to "type3." If "type2" is unacceptable to "type3," then the code verifier 20 detects an error. However, if "type2" is acceptable to "type3," then the code verifier 20 fails to detect an error and allows the composition to continue. Note that the code verifier 20 does not perform a type check between "type2" and "type4." The resulting signature may be expressed as:

|type1→|0010:type6, 0001:type4.

At this point the composition for the signature block is complete.

Note that when the code verifier 20 detects a type error, the code verifier 20 may be configured to invoke the error handler 24. The error handler 24 may be configured to handle detected type errors according to a variety of methodologies. In the preferred embodiment, the error handler 24 transmits a notification message that indicates an error has been detected. This message may be displayed to the user via output device 36. The error handler 24 also takes any necessary steps to ensure that the code 49 being checked is not executed by the system 10.

It should be further noted that it is not necessary for the type signatures to be expressed according to the syntax for the type signatures described herein. Moreover, there are numerous methodologies and syntaxes that may be employed to indicate the input type constraints and the output type descriptions for each instruction. Thus, there are numerous methodologies and syntaxes that may be employed to define and compose the type signatures.

By utilizing the techniques described hereinabove, the code verifier 20 translates the code 49 into a plurality of type signatures and composes these signatures into a single type signature. Furthermore, as previously described, the code 49 may be a method within a program 12, and each method within a program 12 may be verified according to the techniques described herein. It should be noted that, when the code 49 represents a method within a program 12, the final composed signature of the method can be checked against the requirements of the control flow determined for the program.

For example, the final signature's input type descriptions, which represent the input type constraints for the entire method, can be checked to ensure that the input type constraints for the method are satisfied by the argument types of the method, and the final signature's output type descriptions, which represent the output type results for the entire method, can be checked to ensure that the result type of the method is satisfied. In addition, the final signatures of different instruction blocks can be compared to ensure that the output type results of several control flows that come together (e.g., control flows that arise from a conditional statement or expression) are compatible. Furthermore, the final signatures of different instruction blocks can be compared to ensure that output types of values utilized to choose between different control flows are compatible with their use. For example, an output type of a value utilized to choose between different control flows that arise from an "IF" statement or expression can be checked to ensure that the output type is boolean.

Note that conventional compilers utilizing well-known code verification techniques typically check for the same or similar conditions as those described in the above paragraph. Moreover, it should be apparent to one skilled in the art upon reading this disclosure that the final signatures of different methods can be utilized to check for these same or similar conditions.

OPERATION

The preferred use and operation of the blocking system 20 and associated methodology are described hereafter.

Through conventional techniques, a compiled set of code 49 is downloaded into memory 15. Before the code 49 is executed by the system 10, the code verifier 20 first checks the code 49 for type errors. In this regard, the code verifier 20 analyzes the code 49 to determine the program flow of the code 49 and subdivides or groups the code 49 into various code blocks 52–56 (FIG. 3), as shown by block 105 of FIG. 6. The code verifier 20 then translates code blocks 52–56 into signature blocks 62–66 by translating each instruction of the code 49 into a type signature in block 107. Next, the code verifier 20 selects one of the signature blocks 62–66 and composes each of the signatures of the selected block 62–66 to form a single type signature for the selected block 62–66, as shown by blocks 111 and 115. If any type errors are detected during block 115, the code verifier 20 invokes the error handler 24 and the code verification process is terminated, as shown by blocks 121 and 123.

As an example, assume that one of the blocks 52–56 includes the following Java instructions:

| | |
|---|---|
| aload_0000 | // loads from local type variable 0000 |
| invoke string_length | // calls a Java function that computes the length of a string |
| iload_0001 | // loads an int type from local variable 0001 |
| iadd | // computes the sum of two integers |
| istore_0010 | // stores an integer into local variable 0010. |

The foregoing instructions may be translated by code verifier 20 into a signature block 62–66 having the following type signatures:

| | |
|---|---|
| 0000:\|example\|→\|example\| | (Signature A.4) |
| \|String→int\| | (Signature B.4) |
| 0001:\|int\|→\|int\| | (Signature C.4) |
| \|int, int→int\| | (Signature D.4) |
| \|int→\|0010:int | (Signature E.4), | where "example" is a type variable. The code verifier 20 may then select the foregoing signature block 62–66 and compose the above signatures in any order provided that only successive signatures are composed in any single composition. In this regard, assume that code verifier 20 first composes Signatures A.4 and B.4 into a single signature. During this composition, assume that the code verifier 20 changes the type variable name "example" to "example1." After the composition, signatures would be expressed as:

| | |
|---|---|
| 0000: \|example1\|→\|int\|example1:String | (Signature AB.4) |
| 0001:\|int\|→\|int\| | (Signature C.4) |
| \|int, int→int\| | (Signature D.4) |
| \|int→\|0010:int\| | (Signature E.4). |

Next, assume that the code verifier 20 composes Signatures E.4 and D.4. During this composition, the code verifier 20 determines that the type description "int" for the outType of Signature D.4 is acceptable to the type description "int" for the inType of Signature E.4. If these type descriptions had been unacceptable (e.g., had the inType of Signature E.4 been "double" instead of "int"), then the code verifier 20 would have detected a type error and terminated block 115. The code verifier 20 would then have invoked the error handler 24. However, since the foregoing type descriptions are acceptable in the present example, the code verifier 20 completes the composition of Signatures D.4 and E.4 and expresses the signatures for the selected block 62–66 as:

| | |
|---|---|
| 0000:\|example1\|→\|int\|example1:String | (Signature AB.4) |
| 0001:\|integer\|→\|int\| | (Signature C.4) |
| \|int, int→\|0010:int | (Signature DE.4) |

Next, assume that the code verifier 20 composes Signature AB.4 with Signature C.4. After completing this composition, the signatures for the selected block 52–56 should be expressed as:

| | |
|---|---|
| 0000:\|example1, 0001:\|int\|→int, int\|example1:String\|(Signature ABC.4) | |
| \|int, int→\|0010:int | (signature DE.4). |

Next, assume that the code verifier 20 composes the two remaining signatures. During this composition, the code verifier 20 determines that the type descriptions "int, int" for the outType of Signature ABC.4 is acceptable to the type descriptions "int, int" for the inType of Signature DE.4. If these type descriptions had been unacceptable (e.g., had the inType of the last signature been "double, int" or "int, double" instead of "int, int"), then the code verifier 20 would have detected a type error and terminated block 115. The code verifier 24 would then have invoked the error handler 24. However, since the foregoing type descriptions are acceptable in the present example, the code verifier 20 completes the composition of the two remaining signatures and expresses the final signature for the selected block 62–66 as:

0000:example1, 0001:int|→|0010:int.

Note that other sets of instructions may be utilized to define the code blocks 52–56 in other examples. In such examples, the different instructions would be translated into different signatures, and the composition process of the type signatures of the selected block 62–66 would, therefore, be different. However, it should be apparent to one skilled in the art that similar techniques may be employed to compose the signatures of such a selected block 62–66.

Figure 6:
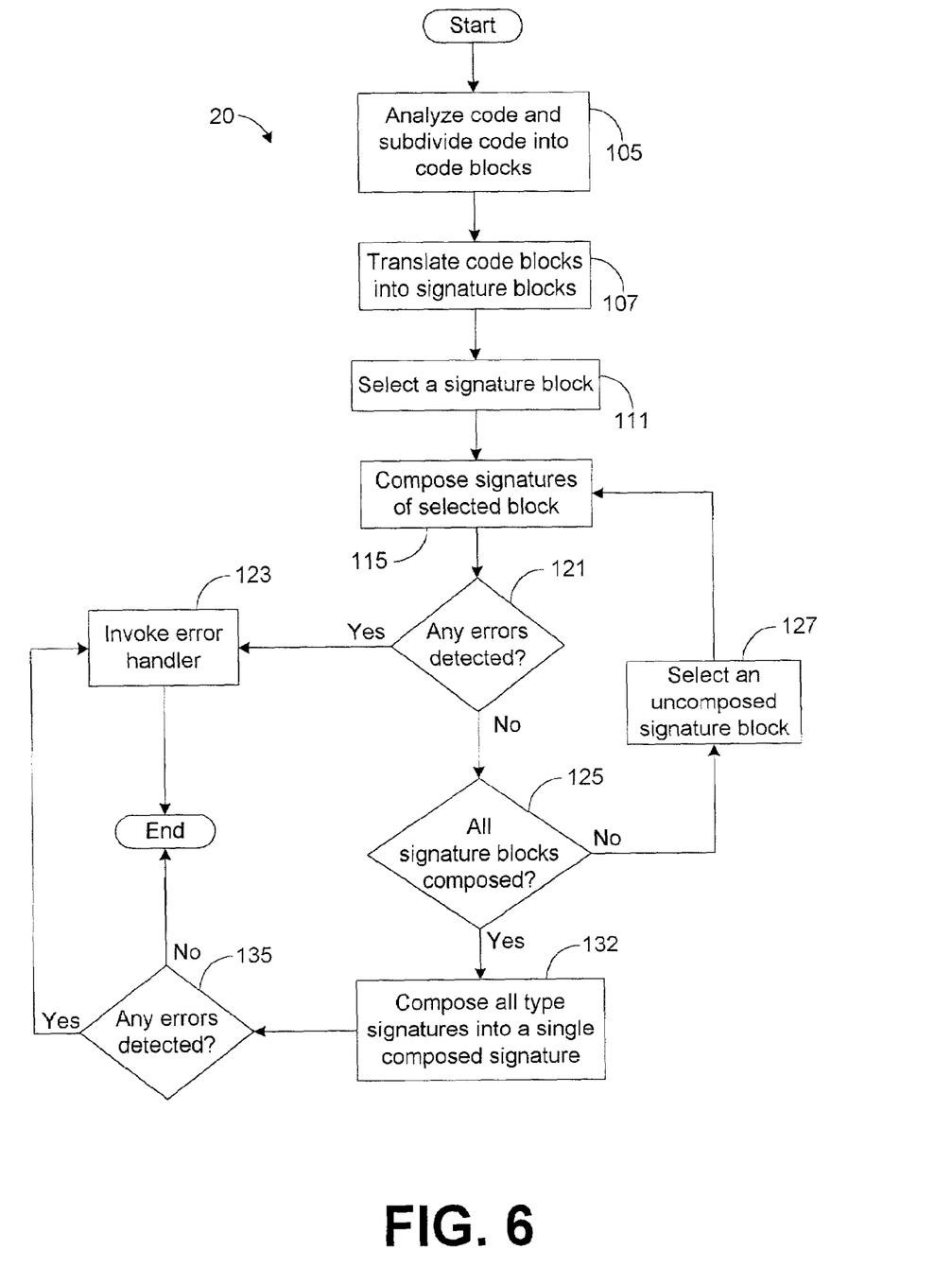
FIG. 6 is a flow chart illustrating the architecture and functionality of the code verifier depicted in FIG. 1.

After successfully composing the signatures of the selected signature block 62–66 in block 115 of FIG. 6, a new signature block 62–66 is selected, and the foregoing process is repeated for this new signature block 62–66, as shown by blocks 112, 115, 121, 125, and 127 of FIG. 6. Thus, each signature block 62–66 is respectively composed into a single type signature.

After each signature block 62–66 has been composed into a single respective type signature, the code verifier 20 then begins to compose the type signatures of the signature blocks 62–66 in block 132 of FIG. 6 until a single type signature for all of the blocks 62–66 is remaining. The same techniques employed to compose the signatures in block 115 may be employed to compose the signatures in block 132. If a type error is detected during block 132, the code verifier 20 terminates block 132 and then invokes the error handler 24, as shown by blocks 123 and 135. If block 132 is completed without detecting a type error, then the code verification process is complete, and the program 12 is verified as being error free by the code verifier 20. Thus, the system 10 is allowed to execute the program 12.

As in block 115, the code verifier 20 may compose type signatures in block 132 in any order provided that only successive signatures are combined in any single composition. As an example, assume that the program flow of program 12 indicates that block 52 is to be the first code block to execute. After execution of block 52, block 54 is to be the next block to execute. Then, block 53 is to execute followed by block 55. Thus, block 56 is to be the last block to execute.

The code verifier 20, in block 132, may compose the signatures of blocks 62–66 in program order. In this example, the code verifier 20 composes the signature of block 62 with the signature of block 64 to form a composed signature. This composed signature is then composed with the signature of block 63 to form a new composed signature. This new composed signature is then composed with the signature of block 65 to form another new composed signature. This other new composed signature is then composed with the signature of block 66 to form the final signature that represents the final composed signature for the entire program 12. Note that the code verifier 20 may not, for example, compose the signature of block 62 directly with the signature of block 63 since these two blocks are not successive within the program flow of the program 12.

In another example, the code verifier 20 may compose the signatures of blocks 62–66 in reverse program order. In this example, the code verifier 20 composes the signature of block 66 with the signature of block 65 to form a composed signature. This composed signature is then composed with the signature of block 63 to form a new composed signature. This new composed signature is then composed with the signature of block 64 to form another new composed signature. This other new composed signature is then composed with the signature of block 62 to form the final signature that represents the final composed signature for the entire program 12.

In yet another example, the code verifier 20 may compose the signatures of blocks 62–66 in an arbitrary manner provided that only successive signatures are composed. For example, the code verifier 20 may first compose the signatures of blocks 62 and 64 to form a first composed signature. The code verifier 20 may then compose the signatures of blocks 66 and 65 to form a second composed signature. The code verifier 20 may then compose the signatures of block 63 and 64 to form a third composed signature. Then, the code verifier 20 may compose the first composed signature with the third composed signature to form a fourth composed signature. Finally, the code verifier 20 may compose the fourth composed signature with the second composed signature to form the final signature that represents the final composed signature for the entire program 12.

It should be noted that the present invention has been described in numerous examples as processing instructions written in Java. However, the present invention should not be so limited, and it should be apparent that instructions from other types of languages can be similarly translated into type signatures, which are then type checked according to the techniques described herein.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A code verification system, comprising:
    memory for storing a compiled program; and
    a code verifier configured to analyze instructions of said program and to generate a plurality of type signatures based on said instructions, each of said type signatures indicating each input type constraint and each output type description for a respective one of said instructions, wherein said code verifier is configured to detect a type error by analyzing said type signatures,
    wherein said code verifier is further configured to analyze said program and to group said instructions of said program into a plurality of code blocks, wherein said code verifier is configured to translate said code blocks into type signature blocks, each of said type signature blocks having one or more type signatures of said plurality of type signatures, said code verifier further configured to compose the type signatures of each of said type signature blocks into a single respective composed type signature.

2. The system of claim 1, wherein said code verifier is configured to compose one of said type signatures with another of said type signatures to form a one of the single composed type signatures, said code verifier further configured to make a determination as to whether an input type constraint of said one type signature is acceptable to an output type description of said other type signature, said code verifier further configured to detect said type error based on said determination.

3. The system of claim 1, wherein said code verifier, in composing one of said type signature blocks, is configured to compose a first type signature with a second type signature to form a single composed signature, said first and second type signatures included within said one type signature block, said code verifier further configured to make a determination as to whether an input type constraint of said first type signature is acceptable to an output type description of said second type signature, said code verifier further configured to detect said type error based on said determination.

4. The system of claim 1, wherein one of said type signatures includes a type description indicative of a type of an input consumed by one of said instructions when said one instruction is executed, wherein another of said type signatures includes a type description indicative of a type of an output produced by another of said instruction when said other instruction is executed, and wherein said code verifier is further configured to detect said type error by comparing said type descriptions.

5. A code verification method, comprising to steps of:
storing a compiled program;
generating a plurality of type signatures based on instructions within said program, each of said type signatures indicating each input type constraint and each output type description for a respective one of said instructions;
analyzing said type signatures;
detecting a type error based an said analyzing step;
grouping said instructions of said program into a plurality of code blocks;
translating said code blocks into type signature blocks, each of said type signature blocks having one or more type signatures of said plurality of type signatures; and
composing the type signatures of each said type signature blocks into a single respective composed type signature.

6. The method of claim 5, further comprising the steps of:
composing one of said type signatures with another of said type signatures thereby forming a single composed type signature of said composed type signatures; and
determining whether an input type constraint of said one type signature is acceptable to an output type description of said other type signature,
wherein said detecting step is further based on said determining step.

7. A code verification method, comprising the steps of:
storing a compiled program, said compiled program having at least one code block that includes a plurality of instructions;
translating said instructions into a plurality of type signatures;
composing said type signatures into a single composed type signature;
analyzing said type signatures;
detecting a type error based on said analyzing step grouping instructions of said program into a plurality of code blocks; translating said code blocks into type signature blocks, each of said type signature blocks having one or more type signature; and composing the type signatures of each of said signature blocks into a single respective composed type signature.

8. The method of claim 7, wherein one of said type signatures includes a type description indicative of a type of an input consumed by one of said instructions when said one instruction is executed, wherein another of said type signatures includes a type description indicative of a type of an output produced by another of said instructions when said other instruction is executed, and wherein said analyzing step includes the step of comparing said type descriptions.

9. A code verifier comprising:
means for generating a plurality of type signatures based on instructions within a compiled program, each of said type signatures indicating each input type constraint and each output type description for a respective one of said instructions;
means for analyzing said type signatures; and
means for detecting a type error based on said analyzing step;
means for grouping said instructions of said program into a plurality of code blocks;
means for translating said code blocks into type signature blocks, each of said type signature blocks having one or more type signatures of said plurality of type signatures; and
means for composing the type signatures of each said type signature blocks into a single respective composed type signature.

10. The code verifier of claim 9, further comprising:
means for composing one of said type signatures with another of said type signatures thereby forming a single composed type signature of said composed type signatures; and
means for determining whether an input type constraint of said one type signature is acceptable to an output type description of said other type signature.

* * * * *